United States Patent [19]
Kidd, Jr.

[11] Patent Number: 5,590,947
[45] Date of Patent: Jan. 7, 1997

[54] ILLUMINATED WINDSCREEN FOR A MOTORCYCLE FAIRING

[76] Inventor: Larry W. Kidd, Jr., 9603 Muirkirk Rd., Apt. C-151, Laurel, Md. 20708

[21] Appl. No.: 538,282

[22] Filed: Oct. 2, 1995

[51] Int. Cl.⁶ .................................................. B62J 6/00
[52] U.S. Cl. ............................ 362/72; 362/31; 362/80.1
[58] Field of Search ............................. 362/72, 26, 31, 362/27, 80.1, 83.3, 396

[56] References Cited

U.S. PATENT DOCUMENTS

| | | | |
|---|---|---|---|
| 4,320,906 | 3/1982 | Saunders, IV | 362/72 |
| 4,356,536 | 10/1982 | Funabashi et al. | 362/72 |
| 5,062,027 | 10/1991 | Machida et al. | 362/804 |
| 5,229,746 | 7/1993 | Healy et al. | 340/459 |

*Primary Examiner*—Leonard Heyman
*Attorney, Agent, or Firm*—Robert E. Bushnell, Esq.

[57] ABSTRACT

A windscreen for use with a motorcycle hiring. This windscreen incorporates a plurality of light bulbs adjacent a lower edge portion of the windscreen, which portion is attached to the motorcycle fairing, in order to illuminate the windscreen, making it glow with light conducted through windscreen material. The light bulbs are securely positioned in slots formed in the windscreen by clips which clip onto the windscreen.

19 Claims, 3 Drawing Sheets

ILLUMINATED WINDSCREEN FOR A MOTORCYCLE FAIRING

FIELD OF THE INVENTION

The present invention relates to a windscreen, and particularly to an illuminated windscreen for attachment to a motorcycle hiring.

BACKGROUND OF THE INVENTION

It is known to provide a windscreen and fairing assembly at a front end of a motorcycle to reduce wind resistance, and to enhance the appearance of the motorcycle. Such windscreen and fairing assemblies are rigidly attached to the body of the motorcycle. An example of such a windscreen and fairing assembly is discussed in U.S. Pat. No. 4,356,536 to Katsunori Funabashi, et al. and entitled Fairing And Headlight Assembly For A Two-Wheeled Motor Vehicle.

Additionally, it is known to provide transparent colored windscreens, in order to enhance the motorcycle's appearance. However, it is hard to see such windscreens at night, by other drivers for example, and thus the enhanced appearance can not be readily observed.

SUMMARY OF THE INVENTION

It is an object of the present invention to provide a windscreen for a motorcycle fairing having an enhanced appearance which can be observed at night.

It is another object of the present invention to provide a windscreen for a motorcycle fairing wherein the enhanced appearance increases the visibility of the motorcycle to other drivers during day or night thereby increasing the motorcycle operators safety.

These objects may be achieved according to the principles of the present invention by providing a plurality of lights adjacent to a lower edge contour of that portion of the windscreen which attaches to a motorcycle fairing.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more through understanding of the present invention. It will be apparent however, to those skilled in the art, that the present invention may be practiced without these specific details. In other instances, well known circuits have not been described so as not to obscure the present invention.

DETAILED DESCRIPTION OF THE PREFERRED EMBODIMENTS

Figure 1:
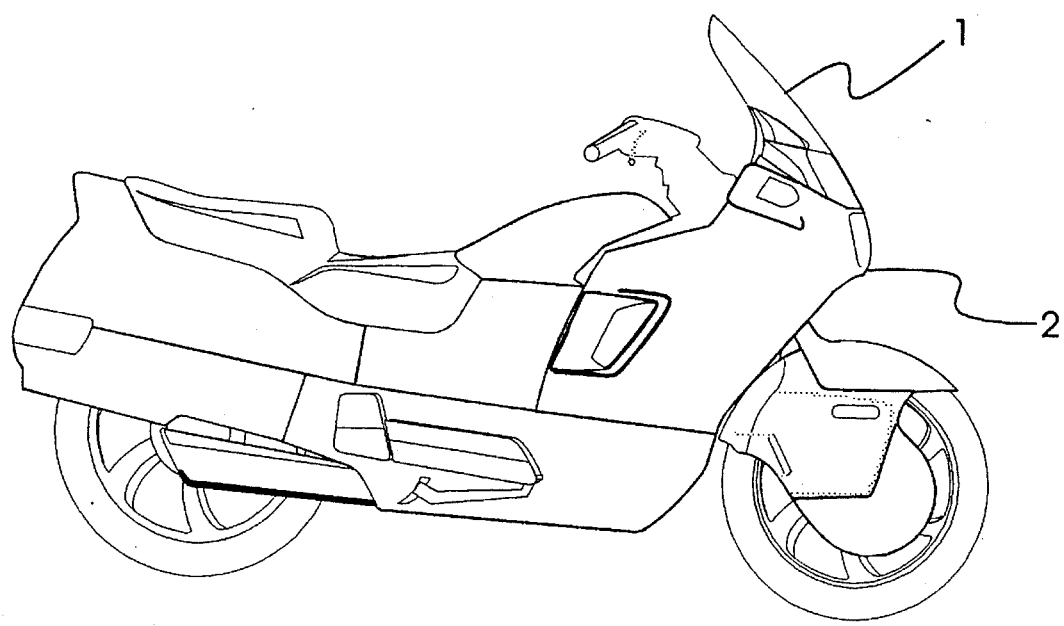
FIG. 1 is an illustration of a motorcycle having a conventional fairing and windscreen assembly mounted thereto.

FIG. 1 is a depiction of a motorcycle having a windscreen 1 attached to a fairing 2 mounted thereto. Windscreen 1 is usually clear in color, but it is known to use transparent colored windscreens in order to enhance the motorcycle's appearance during daylight hours.

Figure 2:
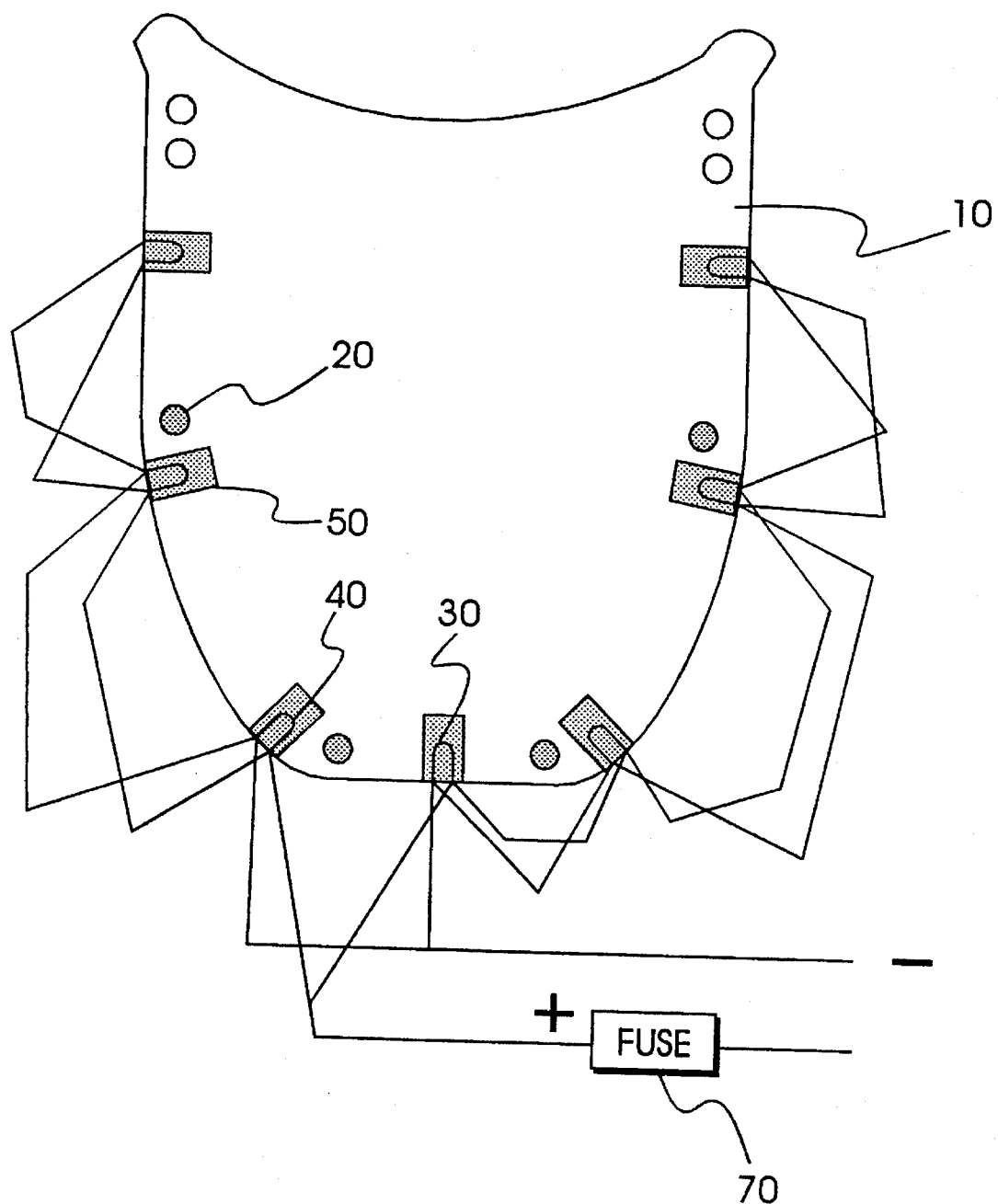
FIG. 2 is an illustration of an illuminated windscreen according to the principles of the present invention.

Referring now to the FIG. 2, there is shown a windscreen 10 which is to be attached to a motorcycle fairing (not shown). Windscreen 10 has a plurality of mounting holes 20 adjacent to a bottom contour portion of windscreen 10 for enabling windscreen 10 to be rigidly attached to the fairing. Portions of windscreen 10 are removed to form a plurality of notches or slots 30.

A plurality light bulbs 40 are provided so that each slot 30 is fitted with a corresponding bulb 40. Light bulbs 40 are connected via a fuse 70 to a fuse box (not shown) of the motorcycle. Each bulb 40 is held in place in a respective one of slots 30 by a corresponding clip 50. Clips 50 are formed to have a U-shape and are preferably made of a resilient non-corrosive metal. Clips 50 alternatively can incorporate, as an integral component thereof, a socket which receives a respective bulb 40. In order to mount clips 50 on the windscreen 10, the two opposite sides thereof must be spread further apart so that the clip 50 can be slid onto the windscreen 10. The resiliency of clips 50 will hold it in place without fear of it slipping off the edge of windscreen 10. Additionally, a foam or rubber seal can be provided along the edges of clip 50 to increase the friction provided between clip 50 and windscreen 10 and to also provide a watertight seal. Further, clips 50 can have detent, e.g., a protrusion such as a peg or lip, along two edges thereof which will mate with holes or indents formed in windscreen 10 to further ensure that clips 50 remain in their appropriate positions.

Transparent windscreen 10 can be clear or have a fluorescent color. Accordingly, bulbs 40 emit either a colored light or a white light. If a clear windscreen is used then it is preferred that bulbs 40 emit a colored light, and if a fluorescent windscreen is used then it is preferred that bulbs 40 emit a white light. Accordingly, when observed during hours of darkness, the windscreen 10 will have a glow according to the color of the bulb 40 or windscreen 10 used, which preferably corresponds with the color scheme of the motorcycle.

Additionally, windscreen 10 acts as a waveguide for the light emitted by bulbs 40. This light can be advantageously used by etching a logo or other message into a backside surface of windscreen 10. The light being guided by windscreen 10 will disperse at the etchings thereby outlining the etched logo or message. Further, since windscreen 10 guides the light emitted by bulbs 40 the upper edge of the windscreen 10 can be made impermeable to the light by painting the edge with a paint of similar color to the windscreen 10 or by providing an edge trim along the upper edge of windscreen 10 to prevent the light from being directed into the eyes of the motorcycle operator.

Figure 3:
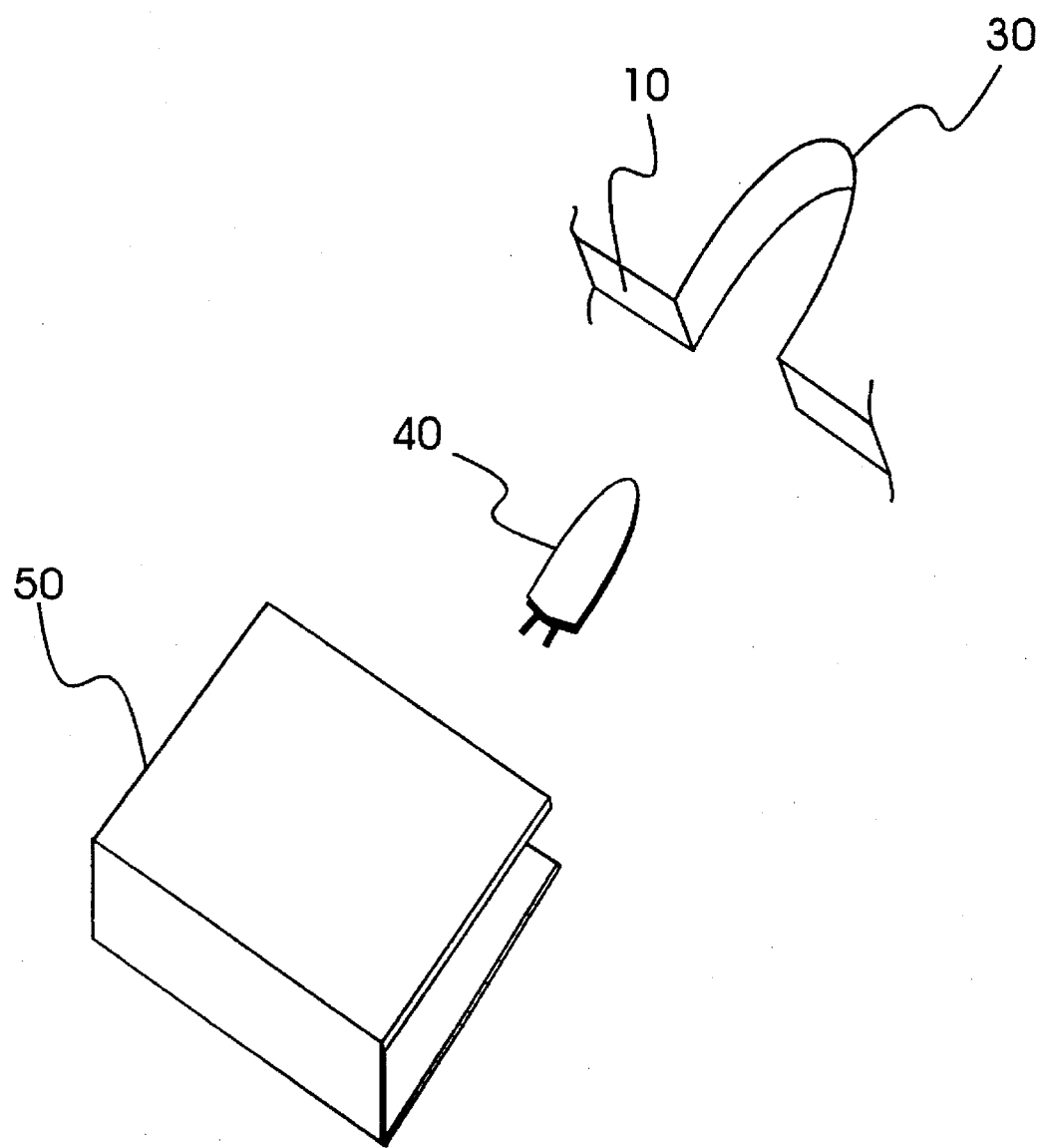
FIG. 3 is an exploded illustration of a portion of the illuminated windscreen according to the principles of the present invention.

FIG. 3 is an exploded illustration of a portion of windscreen 10 having a slot 30 therein which is aligned with one of the bulbs 40 and one of the clips 50.

While there have been illustrated and described what is to he considered to be the preferred embodiment of the present invention, it will be understood by those skilled in the art that various changes and modifications may be made, and equivalents may be substituted for elements thereof without departing from the true scope of the present invention. For, example, the bulbs 40 can be mounted to the fairing to aligned with the slots in the windscreen 10. Alternatively, the bulbs 40 can be mounted to the hiring so as to be adjacent to the bottom edge contour of the windscreen 10 such that the windscreen 10 does not need to have individual slots for each bulb. Therefore, it is intended that the present invention not be limited to the particular embodiment disclosed as the best mode contemplated for carrying out the present invention, but that the present invention includes all embodiments falling within the scope of the appended claims.

What is claimed is:

1. An illuminated windscreen for attachment to a motorcycle fairing, comprising:

a transparent windscreen having means for attaching said windscreen to said fairing; and a plurality of light bulbs adjacently disposed along a lower edge contour of said windscreen for illuminating said windscreen.

2. The illuminated windscreen as set forth in claim 1, further comprising:

a plurality of slots cut into said lower edge contour of said windscreen for receiving said plurality of light bulbs.

3. The illuminated windscreen as set forth in claim 1, further comprising:

a plurality of clips for holding said plurality of light bulbs in a desired position along said lower edge contour of said windscreen.

4. The illuminated windscreen as set forth in claim 2, further comprising:

a plurality of clips, each of said clips holding a respective one of said plurality of light bulbs in a respective one of said slots cut into said lower edge contour of said windscreen.

5. The illuminated windscreen as set forth in claim 1, said windscreen having a fluorescent color.

6. The illuminated windscreen as set forth in claim 1, said plurality of light bulbs emitting a light of a desired color.

7. An illuminated windscreen for attachment to a motorcycle fairing, comprising:

a transparent windscreen having means for attaching said windscreen to said fairing; and at least three light bulbs adjacent to an outer edge contour of said windscreen, said light bulbs emitting light into said windscreen and causing said windscreen to appear to glow.

8. The illuminated windscreen as set forth in claim 7, further comprising:

a plurality of slots cut into said outer edge contour of said windscreen for receiving said light bulbs.

9. The illuminated windscreen as set forth in claim 8, further comprising:

a plurality of clips, each of said clips holding a respective one of said light bulbs in a respective one of said slots cut into said outer edge contour of said windscreen.

10. The illuminated windscreen as set forth in claim 7, said windscreen having a transparent fluorescent color.

11. The illuminated windscreen as set forth in claim 7, said light bulbs emitting a light of a fluorescent color.

12. An illuminated windscreen for attachment to a motorcycle fairing, comprising:

a transparent windscreen;

a plurality of light bulbs adjacent to a lower outer edge contour of said windscreen, said light bulbs emitting light into said windscreen and causing said windscreen to appear to glow;

a plurality of slots cut into said lower outer edge contour of said windscreen for receiving respective ones of said plurality of light bulbs; and means for holding respective ones of said light bulbs in respective ones of said slots.

13. The illuminated windscreen as set forth in claim 12, said means for holding comprising:

a plurality of resilient clips, each of said clips holding a respective one of said light bulbs in a respective one of said slots.

14. An illuminated windscreen for attachment to a motorcycle hiring, comprising:

a transparent windscreen;

a plurality of light bulbs adjacent to a lower outer edge contour of said windscreen, said light bulbs projecting light into said windscreen;

a plurality of slots cut into said lower outer edge contour of said windscreen for receiving respective ones of said plurality of light bulbs; and means for holding respective ones of said light bulbs in respective ones of said slots.

15. The illuminated windscreen as set forth in claim 14, said means for holding comprising:

a plurality of resilient clips, each of said clips holding a respective one of said light bulbs in a respective one of said slots.

16. The illuminated windscreen as set forth in claim 14, said windscreen having a transparent fluorescent color.

17. The illuminated windscreen as set forth in claim 15, said windscreen having a transparent fluorescent color.

18. The illuminated windscreen as set forth in claim 14, said light bulbs projecting light of a fluorescent color.

19. The illuminated windscreen as set forth in claim 15, said light bulbs projecting light of a fluorescent color.

\* \* \* \* \*